(12) United States Patent
Ochiai

(10) Patent No.: US 6,205,387 B1
(45) Date of Patent: Mar. 20, 2001

(54) SPEED CHANGE RATIO CONTROLLER FOR CONTINUOUSLY VARIABLE TRANSMISSION

(75) Inventor: Tatsuo Ochiai, Chigasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/110,253

(22) Filed: Jul. 6, 1998

(30) Foreign Application Priority Data

Jul. 4, 1997 (JP) ..................................................... 9-179271

(51) Int. Cl.[7] .......................... G06F 17/00; G06F 19/00; G06F 7/00
(52) U.S. Cl. .............................. 701/51; 701/52; 701/95; 477/15; 477/47
(58) Field of Search .................................. 701/51, 52, 61, 701/70, 79, 94, 102, 95; 477/46, 47, 37, 73, 77, 15

(56) References Cited

U.S. PATENT DOCUMENTS

| 4,383,456 | * | 5/1983 | Ganoung | 477/100 |
|---|---|---|---|---|
| 4,458,560 | * | 7/1984 | Frank et al. | 477/39 |
| 4,515,041 | * | 5/1985 | Frank et al. | 477/43 |
| 4,590,561 | | 5/1986 | Abo | 364/424 |
| 5,042,324 | | 8/1991 | Suzuki | 74/857 |
| 5,161,433 | | 11/1992 | Sakakibara et al. | 74/866 |
| 5,178,044 | | 1/1993 | Suzuki et al. | 74/866 |
| 5,313,125 | | 5/1994 | Bosman et al. | 310/49 |
| 5,527,232 | | 6/1996 | Seidel et al. | 477/46 |
| 5,607,373 | | 3/1997 | Ochiai et al. | 477/46 |
| 5,695,428 | | 12/1997 | Yuasa et al. | 477/48 |
| 5,749,804 | | 5/1998 | Toukura | 477/47 |

* cited by examiner

Primary Examiner—William A. Cuchlinski, Jr.
Assistant Examiner—Gertrude Arthur
(74) Attorney, Agent, or Firm—Foley & Lardner

(57) ABSTRACT

In a vehicle provided with a continuously variable transmission, when a target speed change ratio sharply decreases due to the release of an accelerator pedal from depression, a real speed change ratio of the continuously variable transmission which follows the target speed change ratio may undershoot the target speed change ratio. Due to this undershoot, the engine rotation speed may temporarily fall below a permitted level. Therefore, the variation rate of the speed change ratio of the transmission is decreased in the terminal phase of the shifting process of the speed change ratio.

11 Claims, 5 Drawing Sheets

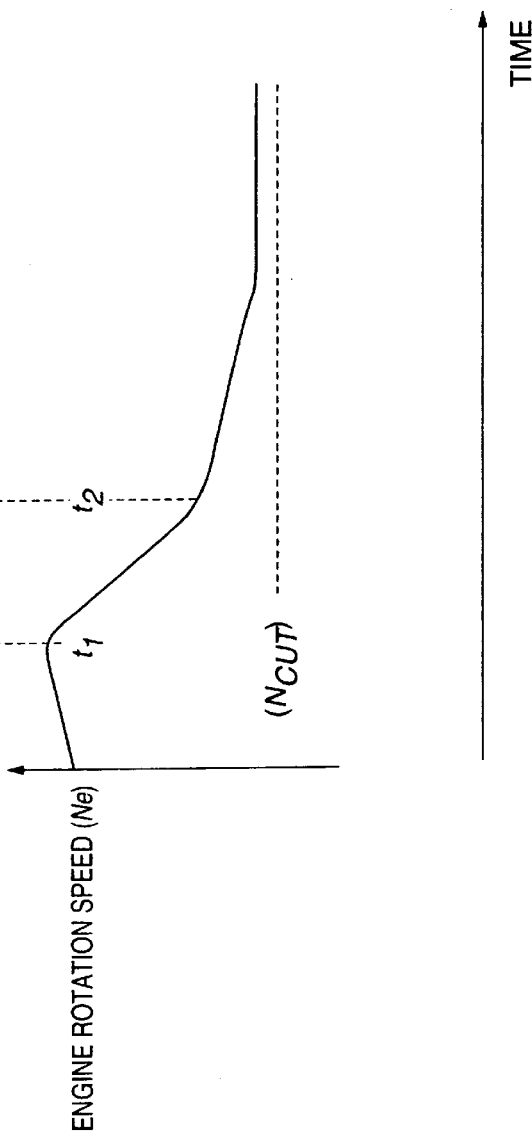
FIG. 6A THROTTLE OPENING (TVO)
FIG. 6B FINAL TARGET SPEED CHANGE RATIO ($i_{pO}$)
TRANSIENT TARGET SPEED CHANGE RATIO ($i_{pT}$)
REAL SPEED CHANGE RATIO ($i_p$)
FIG. 6C ENGINE ROTATION SPEED ($N_e$)

SPEED CHANGE RATIO CONTROLLER FOR CONTINUOUSLY VARIABLE TRANSMISSION

The contents of Tokugan Hei. 9-179271, with a filing date of Jul. 4, 1997 in Japan, are hereby incorporated by reference.

FIELD OF THE INVENTION

This invention relates to control of a continuously variable transmission for a vehicle, and in particular to speed change control when a driver releases his/her foot from the accelerator pedal of the vehicle.

BACKGROUND OF THE INVENTION

In a V-belt or toroidal continuously variable transmission, a target speed change ratio is generally fixed according to a load and a vehicle speed of an engine, and a real speed change ratio is controlled to follow the target speed change ratio under predetermined response characteristics.

In this type of control, when a driver depresses an accelerator pedal to accelerate, the target speed change ratio tends to vary in the increasing direction, as the engine rotation speed increases, so as to maintain the vehicle speed. As a result, the continuously variable transmission shifts down so as to reach the increased target speed change ratio.

Conversely, when the driver releases his/her foot from the accelerator pedal, the target speed change ratio varies in the decreasing direction, as the engine rotation speed decreases, so as to maintain the vehicle speed. As a result, the continuously variable transmission shifts up so as to reach the decreased target speed change ratio.

When the driver releases his/her foot from the accelerator pedal, the accelerator pedal rapidly returns to the state wherein it is not depressed. Consequently, the target speed change ratio also rapidly falls, and the engine rotation speed sharply falls for the same vehicle speed.

Some of the recent vehicles incorporate a fuel cut mechanism so that during coasting of the vehicle when the accelerator pedal is not depressed, fuel supply to the engine is cut in order to improve fuel-cost performance. When the rotation speed drops to a fuel recovery rotation speed due to fuel cut, fuel supply is resumed in order to prevent the engine from stalling.

When the above-mentioned speed change control is combined with such an engine, the engine rotation speed tends to fall to less than the fuel recovery rotation speed when the driver releases his/her foot from the accelerator pedal, and as fuel supply is immediately resumed in order to prevent the engine from stalling, improvement of fuel cost-performance due to fuel cut becomes difficult. Moreover to improve fuel cost-performance, it is desirable to prolong fuel cut time during coasting, and to lock up to the torque converter interposed between the engine and the continuously variable transmission. When fuel supply is resumed in this state, the output torque of the engine rapidly increases. This is transmitted to the vehicle as a shock, and the driver experiences a sense of discomfort.

To resolve this problem, Tokkai Hei 7-301297 for example, published by the Japanese Patent Office in 1995, discloses a method of decreasing the speed change control response sensitivity only when the driver releases his/her foot from the accelerator pedal.

SUMMARY OF THE INVENTION

However, under such a speed change control, the response of the engine is blunted when the driver releases his/her foot from the accelerator pedal, and may still give an uncomfortable sensation to the driver.

It is therefore an object of this invention to prevent engine rotation speed from falling more than necessary while maintaining engine response when depression of an accelerator pedal is released.

In order to achieve the above object, this invention provides a control device for a continuously variable transmission for a vehicle. The vehicle comprises an engine for driving the vehicle, a throttle for varying a rotation output of the engine according to an opening thereof, and an accelerator pedal for varying the opening of the throttle according to a depression thereof. The continuously variable transmission varies the rotation output of the engine to a specified speed change ratio.

The control device comprises a sensor for detecting a degree of the depression of the accelerator pedal, and a microprocessor for controlling the transmission. The microprocessor is programmed to calculate a target speed change ratio according to the degree of the depression of the accelerator pedal, vary the specified speed change ratio of the transmission to the target speed change ratio at a predetermined response sensitivity, determine if the accelerator pedal has been released from the depression from the degree of the depression of the accelerator pedal, and decrease the response sensitivity during a process of changing over of the target speed change ratios before and after the accelerator pedal is released from the depression.

The accelerator pedal depression degree sensor may comprise a sensor for detecting the opening of the throttle. In this case, the microprocessor is further programmed to determine that the accelerator pedal has been released from the depression when the opening of the throttle has become a minimum opening.

The details as well as other features and advantages of this invention are set forth in the remainder of the specification and are shown in the accompanying drawings.

BRIEF DESCRIPTION OF THE DRAWINGS

FIGS. 6A–6C are timing charts showing an example of control results due to the speed change control device.

DESCRIPTION OF THE PREFERRED EMBODIMENTS

Figure 1:
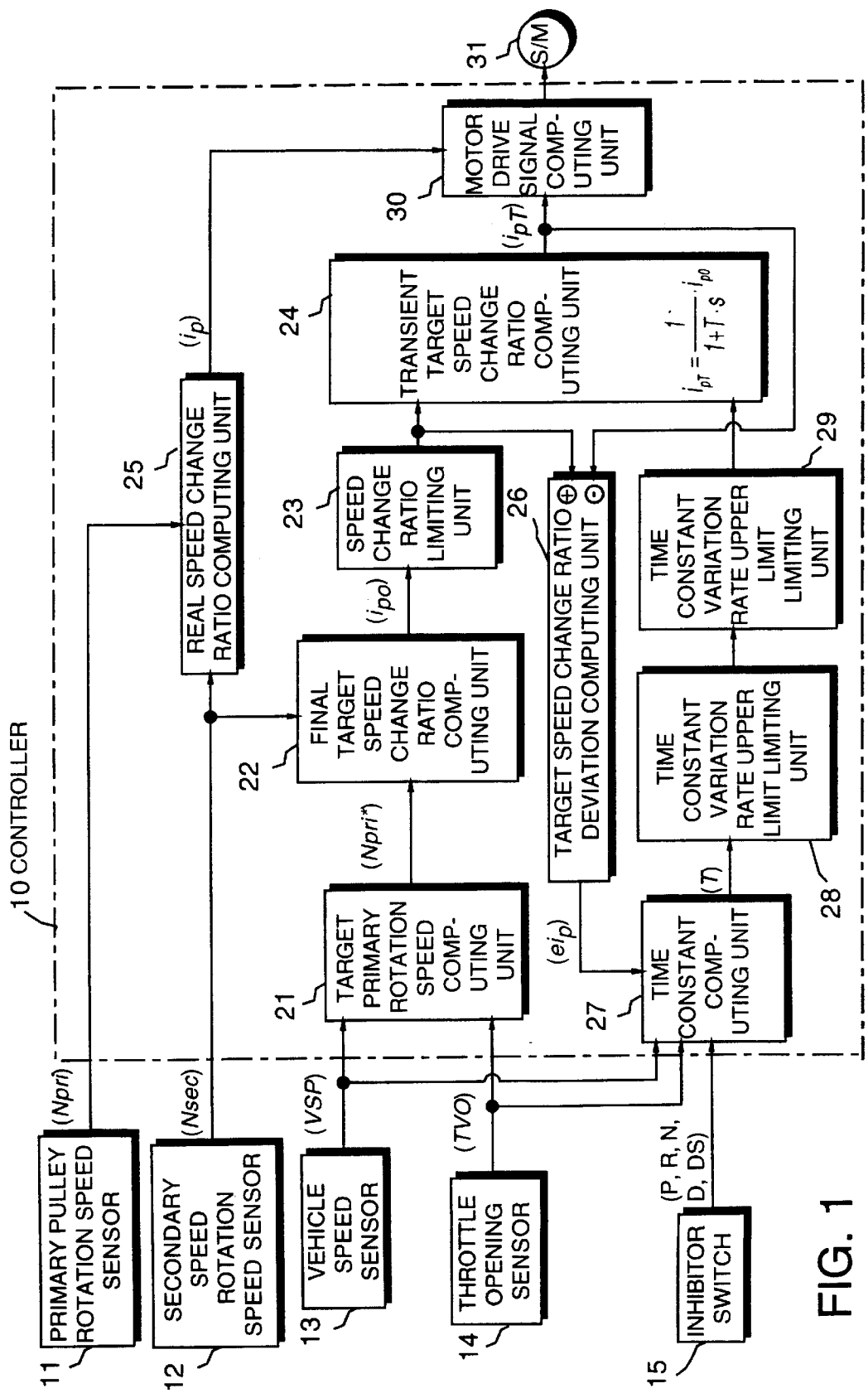
FIG. 1 is a schematic diagram of a speed change control device according to this invention.

Referring to FIG. 1 of the drawings, a control device according to this invention is provided with a controller 10 and step motor 31, and performs speed change control of a V-belt continuously variable transmission of a vehicle.

The V-belt continuously variable transmission comprises a primary pulley connected to the engine via a torque converter, a secondary pulley connected to a propeller shaft which rotates the wheels, and a V-belt looped around these pulleys as disclosed for example in the above-mentioned Tokkai Hei 7-301297, U.S. Pat. No. 5,178,044, and U.S. Pat. No. 5,313,125. The groove widths of these pulleys may be varied so as to obtain a desired speed change ratio. These groove widths are varied corresponding to an angle position of a step motor 31.

The controller 10 comprises a microcomputer comprising a central processing unit (CPU), read-only memory (ROM), random-access memory (RAM) and an input-output interface (I/O interface).

Signals from a primary pulley rotation speed sensor 11 for detecting a rotation speed Npri of the primary pulley, a secondary speed rotation speed sensor 12 for detecting a rotation speed Nsec of the secondary pulley, a vehicle speed sensor 13 for detecting a vehicle speed VSP, a throttle opening sensor 14 for detecting a throttle opening TVO of the engine, and an inhibitor switch 15 for detecting a selection range of a shift lever attached to the continuously variable transmission, are input into the controller 10.

The shift lever is set to, for example, a parking range P, reverse range R, forward travel range D or forward sports travel range Ds which keeps the engine rotation speed higher than the forward travel range D.

Based on these input signals, the controller 10 calculates a target speed change ratio of the continuously variable transmission, and outputs a corresponding drive signal to the step motor 31.

Describing the construction of the controller 10 in a functional way, the controller 10 comprises a target primary rotation speed computing unit 21, a final target speed change ratio computing unit 22, a speed change ratio limiting unit 23, a transient target speed change ratio computing unit 24, a real speed change ratio computing unit 25, a target speed change ratio deviation computing unit 26, a time constant computer unit 27, a time constant lower limit limiting unit 28, a time constant variation rate upper limit limiting unit 29, and a motor drive signal computing unit 30, as shown in FIG. 1.

Figure 2:
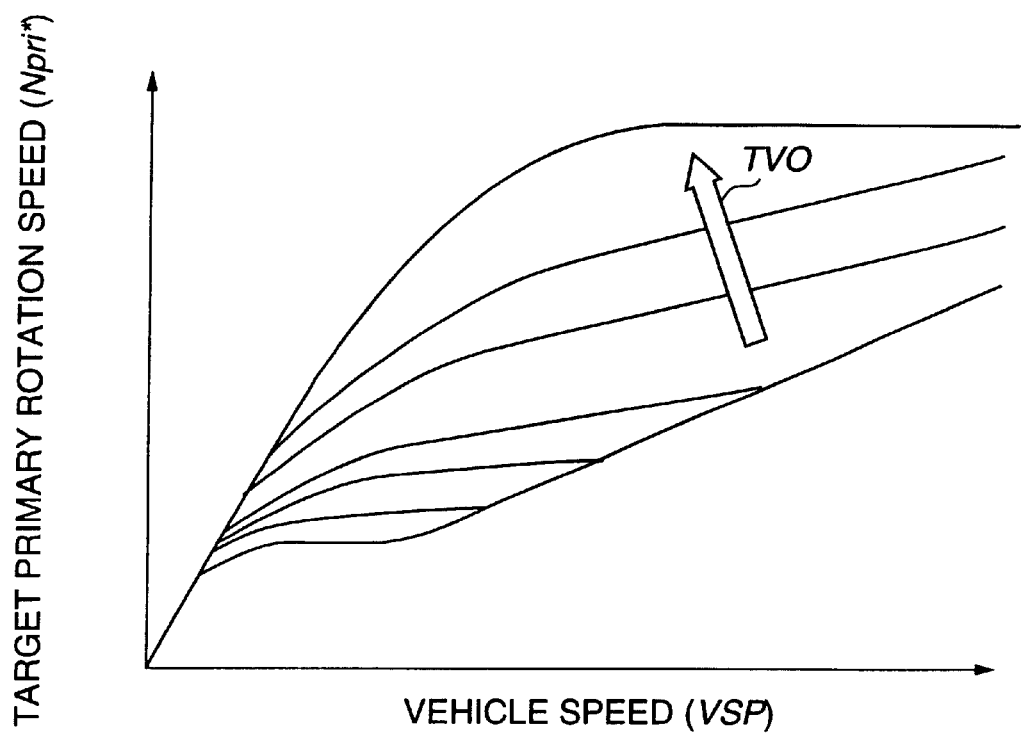
FIG. 2 is a diagram describing a speed change characteristic of a continuously variable transmission to which this invention is applied.

The target primary rotation speed computing unit 21 calculates a target primary rotation speed Npri* from the throttle opening TVO detected by the throttle opening sensor 14 and the vehicle speed VSP detected by the vehicle speed sensor 13 by looking up a map of which the contents are shown in FIG. 2. Since the throttle opening TVO is generally controlled by the depression of an accelerator pedal with which the vehicle is equipped, it is fully possible to detect the depression degree of the accelerator pedal by an accelerator depression sensor 50 and use it instead of the throttle opening TVO for the calculation of the target primary rotation speed Npri*.

Both the throttle opening and the accelerator pedal depression degree should be regarded as the interpretation of acceleration operation by a driver of the vehicle.

The final target speed change ratio computing unit 22 calculates a final target speed change ratio basic value $i_{po}'$ by the following equation from the target primary rotation speed Npri* and the secondary pully rotation speed Nsec detected by the secondary pulley rotation speed sensor 12.

$$i'_{po} = \frac{Npri^*}{Nsec}$$

The speed change ratio limiting unit 23 sets an upper and lower limit of the final target speed change ratio based on the operating limits of the hardware involved in speed change.

The final target speed change ratio $i_{po}$ is calculated by limiting the final target speed change ratio basic value $i_{po}'$ by this upper and lower limit, and is output to the transient target speed change ratio computing unit 24.

The real speed change ratio computer unit 25 calculates a real speed change ratio $i_p$ by the following equation from the primary pulley rotation speed Npri detected by the primary pulley rotation speed sensor 11 and the secondary pulley rotation speed Nsec.

$$i_p = \frac{Npri}{Nsec}$$

The target speed change ratio deviation computing unit 26 calculates a difference between the final target speed change ratio $i_{po}$ calculated by the speed change ratio limiting unit 23, and a transient target speed change ratio $i_{pT}$ calculated by the transient target speed change ratio computing unit 24 through a process described later, by the following equation:

$$ei_p = i_{oo} - i_{pT}$$

Based on the vehicle speed VSP, throttle opening TVO, selection range detected by the inhibitor switch 15 and speed change ratio deviation $ei_p$, the time constant computing unit 27 determines a time constant of speed change ratio control as follows.

The time constant T is a constant which determines the response characteristics of the transient target speed change ratio $i_{pT}$ relative to the final target speed change ratio $i_{po}$, for example as shown in FIG. 6B, so as to determine a speed change rate. This value is used by the transient target speed change ratio computing unit 24 to determine the transient target speed change ratio $i_{pT}$ from the final target speed change ratio $i_{po}$.

Figure 3:
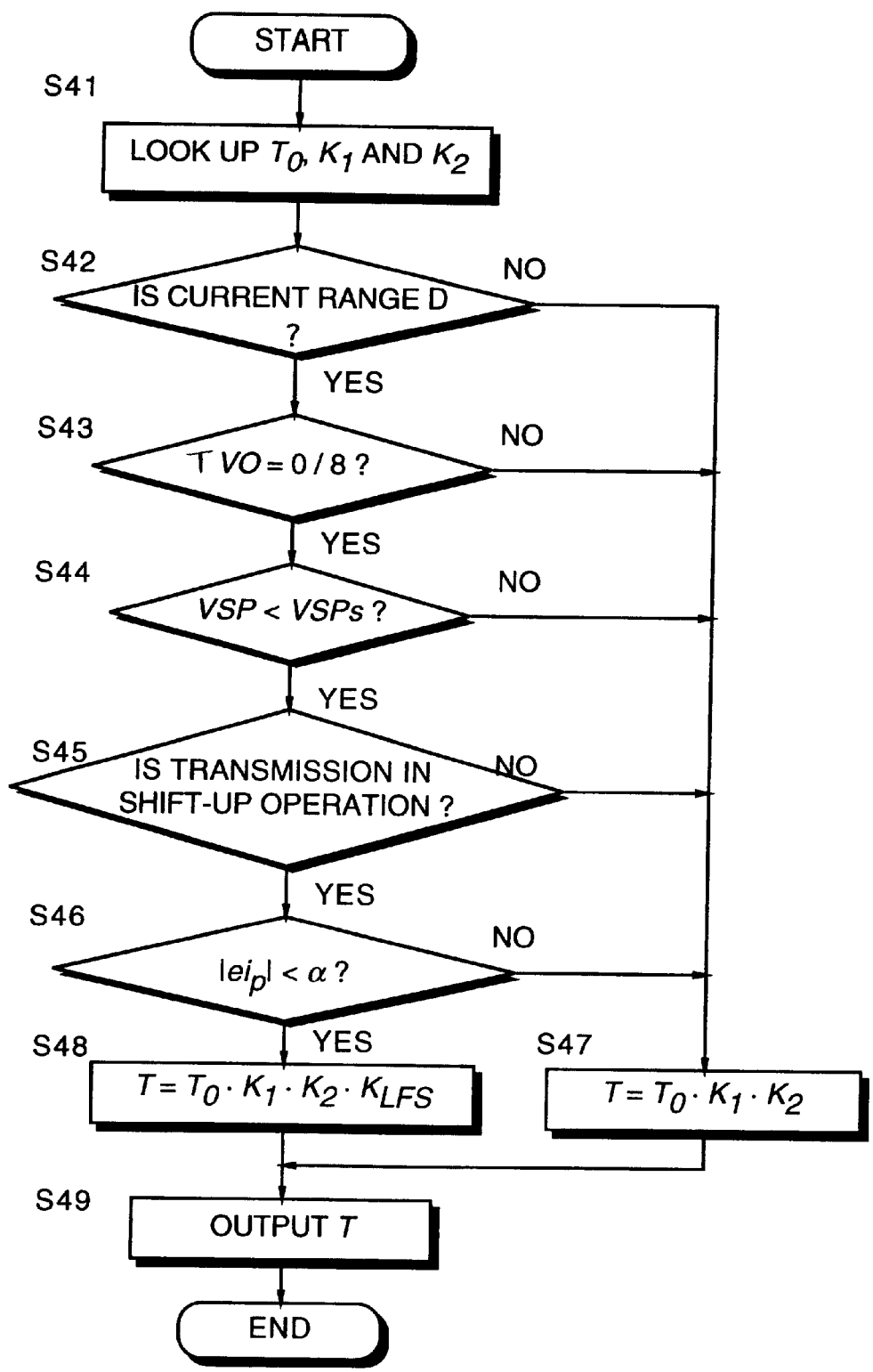
FIG. 3 is a flowchart describing a time constant computing process performed by the speed change control device.

Next, referring to FIG. 3, the processing of the controller 10 relating to this time constant computing unit 27 will be described. This process is performed at a fixed interval.

First, in a step S41, a basic time constant $T_0$, throttle coefficient $K_1$ and vehicle speed coefficient $K_2$ are looked up from a pre-stored map.

Figure 4:
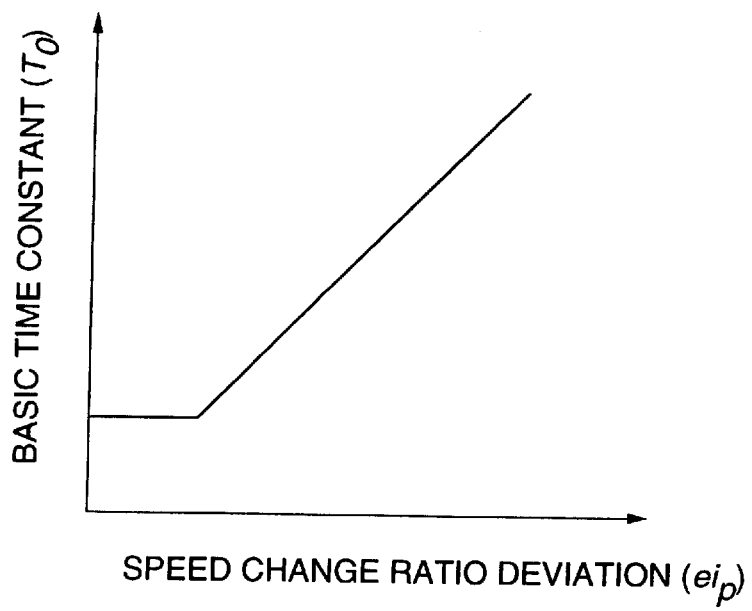
FIG. 4 is a diagram showing the characteristics of a basic time constant used by the speed change control device.

The basic time constant $T_0$ is found by looking up a map corresponding to FIG. 4 based on the aforesaid speed change ratio deviation $ei_p$. The basic time constant $T_0$ is predetermined according to the speed change ratio deviation $ei_p$ so that the speed change to the final target speed change ratio $i_{po}$ is linear. The speed change ratio deviation $ei_p$ used here is a value calculated on the immediately preceding occasion when the process was executed.

The throttle coefficient $K_1$ is a coefficient multiplied by the basic time constant $T_0$ so as to obtain a time constant T corresponding to a desired speed change rate, and is determined according to the throttle opening TVO. Likewise, the throttle coefficient $K_2$ is a coefficient multiplied by the basic time constant $T_0$ so as to obtain the time constant T corresponding to the desired speed change rate, and is determined according to the vehicle speed VSP.

These coefficients are prestored as maps by the controller 10, and are determine by looking up these maps based on the throttle opening TVO and vehicle speed VSP.

In the next step S42, it is determined whether or not a forward travel range D is selected based on a signal from the inhibitor switch 15.

In a step S43, it is determined whether or not the throttle opening TVO is 0/8, i.e. whether or not the throttle is fully closed. The throttle is fully closed when the accelerator pedal is not depressed.

In a step S44, it is determined whether or not the vehicle speed VSP is less than a set vehicle speed VSPs.

When the accelerator pedal is depressed and then the driver releases his/her foot, the target speed change ratio rapidly becomes small, and the engine rotation speed for the same vehicle speed sharply drops as described above. Due to this sharp speed change ratio variation, the real speed change ratio is apt to undershoot the target speed change ratio when a speed change operation is completed. The limiting vehicle speed VSPs may be interpreted as a borderline vehicle speed which determines whether or not the engine rotation speed Ne will fall to a fuel recovery rotation speed $N_{CUT}$ when the real speed change ratio undershoots due to the release of the accelerator pedal.

In this step, when the vehicle speed VSP is less than the boundary vehicle speed VSPs, it is determined that undershoot of the real speed change ratio will result in the engine rotation speed Ne falling to the fuel recovery rotation speed $N_{CUT}$. When the vehicle speed VSP is equal to or greater than the boundary vehicle speed VSPs, it is determined that undershoot of the real speed change ratio causing the engine rotation speed Ne to fall to the fuel recovery rotation speed $N_{CUT}$, will not occur.

In a step S45, it is determined from the sign of the speed change ratio deviation $ei_p$ whether or not the continuously variable transmission is in a shift-up operation.

In a step S46, it is determined whether or not the absolute value of the speed change ratio deviation $ei_p$ is less than a predetermined value α. This is a step to determine whether or not the speed change operation is in a terminal phase when the speed change ratio converges, as shown in FIG. 6B.

Figure 5:
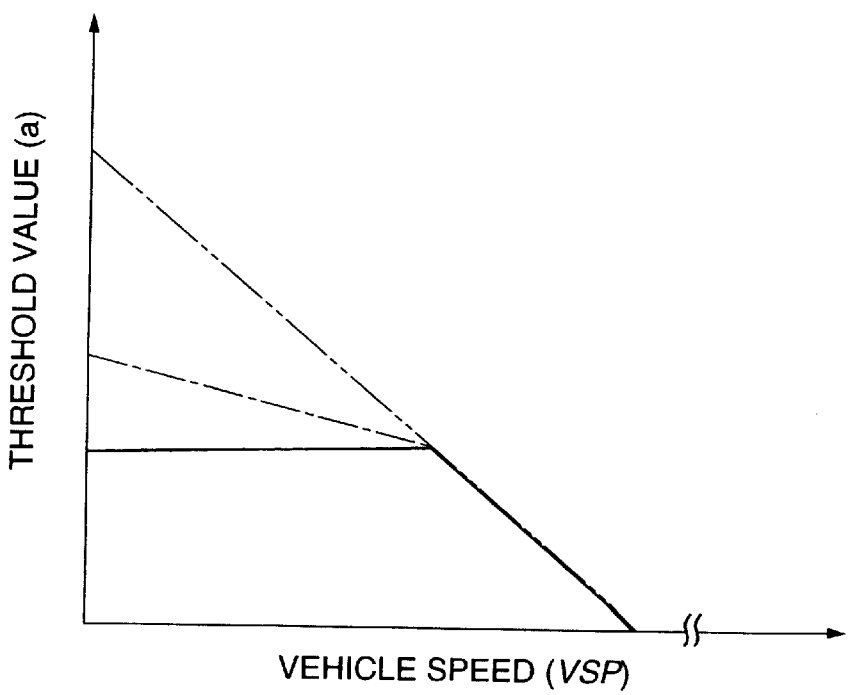
FIG. 5 is a diagram showing the characteristics of a target speed change ratio deviation set by the speed change control device.

The threshold value α varies according to the vehicle speed VSP, as shown by the solid line in FIG. 5. A map of the threshold value α having the characteristics shown in FIG. 5 is stored in the controller 10, and in the step S46, this map is looked up from the vehicle speed VSP to find the threshold value α, and the absolute value of the speed change ratio deviation $ei_p$ and the threshold value α are then compared.

This threshold value α is set to reduce the speed change rate so that the real speed change ratio does not undershoot in the aforesaid undershoot speed region, i.e. the vehicle speed region below the boundary vehicle speed VSPs. When the absolute value of the speed change ratio deviation $ei_p$ is less than the threshold value α, it is determined that the speed change operation is in its terminal phase when undershoot easily occurs, so processing described hereafter is performed to reduce the speed change rate in order to prevent undershoot.

It is not essential to set the threshold value α to the characteristics shown by the solid line in FIG. 5, and it may be set for example to the characteristics shown by the single dotted line or double dotted line in the figure.

When all the conditions of the step S42–S46 hold, i.e. when the forward travel range D is selected, the throttle is fully closed, the vehicle speed is less than the boundary vehicle speed, and the absolute value of the speed change ratio deviation $ei_p$ is less than the threshold value when the transmission is performing a shift-up operation, it means that the speed change ratio is varying so as to cause the real speed change ratio to undershoot and that the speed change operation is in its terminal phase, due to the fact that the driver has stopped depressing the accelerator pedal.

In this case, the routine proceeds to a step S48, and the time constant T is set by the following equation:

$T = T_0 \cdot K_1 \cdot K_2 \cdot K_{LFS}$ where, $K_{LFS}$ = increase coefficient>1

On the other hand, when any of the conditions of the aforesaid steps S42–S46 does not hold, it is determined that there is no risk that the real speed change ratio will undershoot. In this case, the routine proceeds to a step S47, and the time constant T for the ordinary situation is set by the following equation:

$T = T_0 \cdot K_1 \cdot K_2$

In this way, the time constant T set in the step S48 is increased by a foot release shift-up coefficient $K_{LFS}$ relative to the time constant set in the step S47. Due to this, the shift-up speed change rate falls, and the real speed change ratio is prevented from undershooting the target speed change ratio.

In a step S49, the set time constant T is output to the lower limit limiting unit 28 and the process terminates.

To determine the foot release shift-up coefficient $K_{LFS}$, the undershoot state which causes the engine rotation speed Ne to fall to the fuel recovery rotation speed $N_{CUT}$ is found experimentally, and the shift-up coefficient $K_{LFS}$ is then determined so that the engine rotation speed Ne remains at a level at which undershoot does not occur based on the speed change rate at that time.

In this way, the time constant computing unit 27 sets the time constant T. The lower limit limiting unit 28 limits the time constant T set in this way so that it does not fall below the lower limit, and the upper limit limiting unit 29 limits the variation rate of the time constant T so that it does not exceed the preset upper limit.

The transient target speed change ratio computing unit 24 calculates the transient target speed change ratio $i_{pT}$ by the following equation using the time constant T processed as described above, and the final target speed change ratio $i_{po}$ calculated by the speed change ratio limiting unit 23:

$$i_{pT} = \frac{1}{1 + T \cdot s} \cdot i_{po}$$

where, s=Laplacian operator

The motor drive signal computing unit 30 calculates a step motor drive signal to eliminate this difference based on the difference between the transient target speed change ratio $i_{pT}$ and real speed change ratio $i_p$, and this signal is output to the step motor 31.

For example, when the driver releases his/her foot from the accelerator pedal at a time $t_1$, the throttle opening TVO becomes 0/8 as shown in FIG. 6A, and the engine rotation speed Ne begins to fall as shown in FIG. 6C. If the vehicle speed VSP is less than the set vehicle speed VSPs at that time, the following speed change control is then applied.

When the throttle opening is sharply closed, firstly, the final target speed change into $i_{po}$ rapidly becomes small, and the speed change ratio deviation $ei_p$ increases. The absolute value of the speed change ratio deviation $ei_p$ is therefore larger than the threshold value α, the time constant T for the ordinary situation is set in the step S47, and the transient target speed change ratio $i_{pT}$ decreases based on this time constant T.

As the transient target speed change ratio $i_{pT}$ decreases, the speed change ratio deviation $ei_p$ decreases and becomes equal to the threshold value α at a time $t_2$.

After this time point $t_2$, the time constant T calculated in the step S48 is applied. This time constant T is increased by the increase coefficient $K_{LPS}$ relative to the time constant calculated in the step S47, so after the time $t_2$, the variation of the transient target speed ratio $i_{pT}$ becomes more gradual. Eventually, the transient target speed change ratio $i_{pT}$ coincides with the final target speed change ratio $i_{po}$.

By comparison, when the increase coefficient $K_{LPS}$ is not applied in the terminal phase of the variation of the transient target speed change ratio, the transient target speed change ratio may temporarily undershoot the final target speed change ratio $i_{po}$.

In an engine provided with a fuel cut mechanism, fuel cut is performed when the accelerator pedal is released, but if the engine rotation speed Ne falls below the fuel recovery rotation speed $N_{CUT}$ due to this undershoot, fuel supply is resumed.

However, by applying the increase coefficient $K_{LPS}$ in the terminal phase of speed change variation, the fall of the engine rotation speed Ne is more gradual and it does not fall below the fuel recovery rotation speed $N_{CUT}$ as shown in FIG. 6C, so the vehicle can coast while maintaining fuel cut.

The increase of the time constant T is limited to the terminal phase of the speed change ratio variation, so deterioration of speed change control response is suppressed to a minimum.

In the aforesaid embodiment, the time constant T for the ordinary situation is calculated from the basic time constant $T_0$ and the coefficients $K_1$, $K_2$ however the time constant T can also be fixed between the time $t_1$ and the time $t_2$, and the time constant T increased after the time $t_2$.

The essential feature of this invention is that the speed change ratio response is made gradual in the terminal phase of speed change ratio variation when the throttle is suddenly closed, and the increase of the time constant is one example of this.

However the speed change ratio response can be made gradual also by another method, e.g. by slowing the rotation speed of the motor 31 as disclosed in Tokkai Hei 7-301297.

In the above embodiment, a speed change control device applied to a V-belt continuously variable transmission was described, but it will be understood that this invention may also be applied to a toroidal continuously variable transmission.

What is claimed:

1. A control device for a continuously variable transmission for a vehicle, said vehicle comprising an engine for driving said vehicle, a throttle for varying a rotation output of said engine according to an opening thereof, an accelerator pedal for varying the opening of said throttle according to a depression thereof, and said continuously variable transmission varying the rotation output of said engine to a specified speed change ratio, said control device comprising:
   a sensor for detecting a degree of the depression of said accelerator pedal; and
   a microprocessor programmed to:
      calculate a target speed change ratio according to the degree of the depression of said accelerator pedal;
      vary the specified speed change ratio of said transmission to said target speed change ratio at a predetermined response sensitivity,
      determine if said accelerator pedal has been released from the depression based on the detected degree of the depression of said accelerator pedal, and
      decrease said response sensitivity during a process of changing over of said target speed change ratios before and after the accelerator pedal is released from the depression.

2. A control device as defined in claim 1, wherein said sensor comprises a sensor for detecting the opening of said throttle and said microprocessor is further programmed to determine that said accelerator pedal has been released from the depression when the opening of said throttle has become a opening.

3. A control device as defined in claim 1, wherein said microprocessor is further programmed to make the speed change ratio of said continuously variable transmission to follow said target speed change ratio with a predefined time constant, and reduce said response sensitivity by increasing said time constant.

4. A control device as defined in claim 2, wherein said control device further comprises a sensor for detecting a vehicle speed, and said microprocessor is further programmed to set said target speed change ratio based on said opening of said throttle and vehicle speed, set a transient target speed change ratio which follows the target speed change ratio with said time constant, and control the speed change ratio of said continuously variable transmission to said transient target speed change ratio.

5. A control device as defined in claim 4, wherein said control device further comprises a sensor for detecting a real speed change ratio of said continuously variable transmission, and said microprocessor is further programmed to increase said time constant when a deviation between said transient target speed change ratio and said real speed change ratio is less than a predetermined threshold value.

6. A control device as defined in claim 5, wherein said microprocessor is further programmed to vary said threshold value based on said vehicle speed.

7. A control device as defined in claim 5, wherein said engine comprises a fuel cut mechanism which cuts fuel supply to said engine when said accelerator pedal is released from the depression, and resumes fuel supply when said engine rotation speed is less than a predetermined recovery rotation speed, and said microprocessor is further programmed to set an increase factor of said time constant so that said engine rotation speed does not fall below the recovery rotation speed due to the release of said accelerator pedal from the depression.

8. A control device as defined in claim 1, wherein said control device further comprises a sensor for detecting a vehicle speed, and said microprocessor is further programmed to reduce said response sensitivity when said vehicle speed is larger than a predetermined vehicle speed.

9. A control device as defined in claim 1, wherein said control device comprises a sensor for detecting a speed change direction of said transmission, and said microprocessor is further programmed not to reduce said response sensitivity when said speed change direction corresponds to an increase direction of said speed change ratio.

10. A control device as defined in claim 1, wherein said process of change over of said target speed change ratios comprises a terminal phase and an early phase which precedes said terminal phase, and said microprocessor is further programmed to set said response sensitivity to be lower in said terminal phase in said early phase.

11. A control device for a continuously variable transmission for a vehicle, said vehicle comprising an engine for driving said vehicle, a throttle for varying a rotation output of said engine according to an opening thereof, an accelerator pedal for varying the opening of said throttle according to a depression thereof, and said continuously variable transmission varying the rotation output of said engine to a specified speed change ratio, wherein said control device comprises:

means for detecting a degree of the depression of said accelerator pedal, means for calculating a target speed change ratio according to the degree of the depression of said accelerator pedal, means for varying the specified speed change ratio of said transmission to said target speed change ratio at a predetermined response sensitivity, means for determining if said accelerator pedal has been released from the depression based on the detected degree of the depression of said accelerator pedal, and means for decreasing said response sensitivity during a process of changing over of said target speed change ratios before and after the accelerator pedal is released from the depression.

\* \* \* \* \*